(12) United States Patent
Sampathkumar et al.

(10) Patent No.: US 8,639,852 B2
(45) Date of Patent: Jan. 28, 2014

(54) BURST ACCESS PROTOCOL

(75) Inventors: Ramkumar Sampathkumar, San Diego, CA (US); Phani B. Avadhanam, San Diego, CA (US); Siddharth Jayaraman, San Diego, CA (US); Michael Bailey, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 351 days.

(21) Appl. No.: 12/887,206

(22) Filed: Sep. 21, 2010

(65) Prior Publication Data

US 2011/0231858 A1    Sep. 22, 2011

Related U.S. Application Data

(60) Provisional application No. 61/261,133, filed on Nov. 13, 2009.

(51) Int. Cl.
 *G06F 3/00* (2006.01)
(52) U.S. Cl.
 USPC ..................................... 710/8; 710/6; 710/10
(58) Field of Classification Search
 None
 See application file for complete search history.

(56) References Cited

U.S. PATENT DOCUMENTS

| | | | |
|---|---|---|---|
| 6,052,773 A | 4/2000 | Dehon et al. | |
| 6,158,000 A | 12/2000 | Collins | |
| 6,336,185 B1 | 1/2002 | Sargenti, Jr. et al. | |
| 6,339,819 B1 | 1/2002 | Huppenthal et al. | |
| 7,281,127 B2 | 10/2007 | Rothman et al. | |
| 7,526,639 B2 | 4/2009 | Duron et al. | |
| 7,568,197 B1* | 7/2009 | Kiick et al. | 718/100 |
| 7,600,109 B2 | 10/2009 | Ueltschey et al. | |
| 7,882,341 B2 | 2/2011 | Rothman et al. | |
| 2005/0223213 A1 | 10/2005 | Poznanovic | |
| 2008/0052504 A1 | 2/2008 | Tsuji et al. | |
| 2008/0148037 A1 | 6/2008 | Rothman et al. | |
| 2009/0083528 A1 | 3/2009 | Li et al. | |
| 2009/0248920 A1 | 10/2009 | Chaudhuri et al. | |
| 2009/0265783 A1* | 10/2009 | Huynh et al. | 726/22 |
| 2009/0327533 A1* | 12/2009 | Kallam et al. | 710/25 |
| 2011/0231640 A1 | 9/2011 | Avadhanam | |

OTHER PUBLICATIONS

International Search Report and Written Opinion—PCT/US2010/056603—ISA/EPO—Apr. 11, 2011.
Redheendran T M, Booting DSP563XX Devices Through the Serial Communication Interface (SCI), Freescale Semiconductor, Rev.1, 812005.

* cited by examiner

*Primary Examiner* — Zachary K Huson
(74) *Attorney, Agent, or Firm* — Fulbright & Jaworski LLP

(57) ABSTRACT

Methods and systems provide a burst access protocol that enables efficient transfer of data between a first and a second processor via a data interface whose access set up time could present a communication bottleneck. Data, indices, and/or instructions are transmitted in a static table from the first processor and stored in memory accessible to the second processor. Later, the first processor transmit to the second processor a dynamic table which specifies particular data, indices and/or instructions within the static table that are to be implemented by the second processor. The second processor uses the dynamic table to implement the identified particular subset of data, indices and/or instructions. By transmitting the bulk of data, indices and/or instructions to the second processor in a large static table, the burst access protocol enables efficient use of data interfaces which can transmit large amounts of information, but require relatively long access setup times.

44 Claims, 13 Drawing Sheets

BURST ACCESS PROTOCOL

RELATED APPLICATIONS

This application claims the benefit of priority to U.S. Provisional Patent Application No. 61/261,133 entitled "Burst Access Protocol and Priority Initialization of a Second Processor" filed Nov. 13, 2009, the entire contents of which are hereby incorporated by reference.

BACKGROUND

Many forms of electronic devices require communication of data instructions between two or more processors within the device. Electronic devices that process large amount of data, such as digital media receivers, must perform many complex operations in real-time. One of the challenges of designing electronic devices involves exchanging data among two or more processors in an efficient manner that enables real-time processing. Data interfaces which require a relatively long setup time before a data exchange can be accomplished present the possibility of data communication bottlenecks. Such communication bottlenecks can lead to compromised operation and reduced functionality. High-speed data interface circuits are known, but they may be expensive and may be incompatible in certain hardware architectures.

SUMMARY

Embodiments include methods and systems for passing data from a first processor to a second processor through a data interface. These embodiments may involve transmitting a static table of a first set of information from the first processor to the second processor via the data interface in a first transmission, storing the static table in memory accessible by the second processor, transmitting a dynamic table of a second set of information from the first processor to the second processor via the data interface in a second transmission, storing the dynamic table in memory accessible by the second processor, accessing the second set of information in the dynamic table to determine to determine an indicated portion of the first set of information to implement, and implementing the indicated portion of the first set of information in the second processor.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
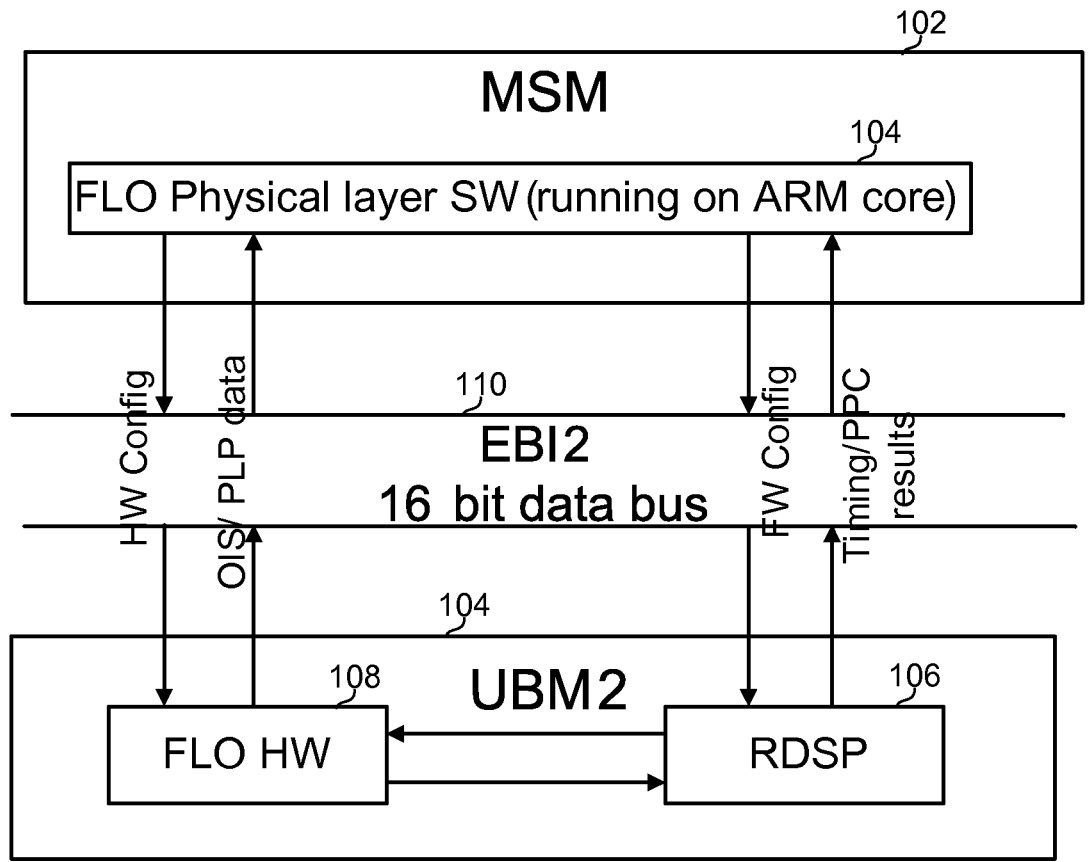
FIG. 1 is a hardware architecture diagram of a prior art data interface between a mobile subscriber modem and a mobile television receiver chip.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device" refers to any one or all of cellular telephones, personal data assistants (PDA's), palm-top computers, lap-top computers, wireless electronic mail receivers (e.g., the Blackberry® and Treo® devices), multimedia Internet enabled cellular telephones (e.g., the Blackberry Storm®), Global Positioning System (GPS) receivers, wireless gaming controllers, and similar personal electronic devices which include a first programmable processor, a second programmable processor coupled to the first programmable processor via a data interface circuit. An example mobile device is a mobile TV broadcast receiver.

The various embodiments provide mechanisms and systems for solving communication bottlenecks that may arise between integrated circuit elements within computing devices. The increasing speed and complexity of integrated circuit used in multimedia receivers, communication devices and computing devices has placed increasing demands upon the transmission of large amounts of data in real time among large components. In many cases, the bottleneck in data communication is due to the time required to set up a data transfer over any interfacing data bus. For example, the Secure Digital input/output (SDIO) interface, which is used in many electronic devices such as cameras, GPS receivers, modems, Bluetooth adapters, radio tuners, and others that combine an SD card with an I/O device, can transfer large amounts of data in contiguous blocks, but requires a set up sequence that is not time-efficient for single data transfer operations. The relatively long access set up time of the SDIO interface means that the circuit may become a communication bottleneck in electronic devices that require real-time operations and data communications among various internal components. Thus, while the SDIO interface is affordable, well understood in the industry, and very efficient for moving large blocks of data, its relatively slow setup process makes it unsuitable for many integrated circuits that require real time read/write operations.

The various embodiments provide a communication protocol that can overcome communication bottlenecks in data interface circuits (e.g., the SDIO interface). Referred to herein as the "burst access protocol," the various embodiments enable integrated circuits implementing such a protocol to take advantage of the large block writing efficiency of such data interface circuits while compensating for their slow single access characteristics. This is accomplished by configuring and transferring data, indices, and/or instructions from a first processor to a second processor in two data tables that the second processor can use to implement instructions specified by the first processor. A first table is a relatively static table that is referred to herein as a "static interface table" or simply as a "static table." The static table is used for transferring instructions, data, register indices, and set up parameters in a large block of data that can be transmitted in advance of being used by the second processor. A second table used for communicating instruction sequences and frequently changing data is referred to herein as a "dynamic interface table" or simply as a "dynamic table." The dynamic table is used for controlling the second processor by including information, such as individual or sequences of data tables within the static table that are to be implemented, along with dynamic data that the second processor can use as a guide for executing processes stored in the static table. By transmitting in advance most of the data, register indices, instructions, sequences and configuration data that may be implemented in the second processor in the static table, a data interface with a long setup time can be used efficiently by a first processor to control a second processor by reducing the number and frequency of data transfers over the interface.

An example application of the various embodiments involves an interface between a Qualcomm MediaFLO receiver chip, referred to as a UBM2 chip, and a Qualcomm Mobile Subscriber Modem (MSM) chip. In a new implementation, the UBM2 chip is being coupled with an MSM chip using the SDIO interface. As mentioned above, the SDIO interface can transmit large blocks of data very quickly; however, each data transfer requires set up processing that makes the interface unsuitable for frequent transmissions of real time instructions and data. To overcome these deficiencies, the burst access protocol described herein may be implemented to permit the ARM (Advanced reduced instruction set computer (RISC) Machine) processor within the MSM chip to configure and control the receiver digital signal processor (RDSP) within the UBM2. This application of the burst access protocol for use with the MSM and UBM2 chips interconnected with an SDIO interface is used as an illustrative example of an implementation of the various embodiments, and is not intended to limit the scope of the claims to this particular application or hardware architecture.

Interacting with the UBM2 chip from the FLO Protocol Stack (FPS) software running on the MSM involves several time critical transactions which have to be accomplished in the order of milliseconds or even sub-milliseconds. Until recently, such transactions were accomplished over a high speed interface known as EBI2 that had a transaction time of ~100 nanoseconds which is well within the real time requirements. FIG. 1 illustrates the hardware architecture 100 previously used for interfacing MSM chips 102 with UBM2 chips 104 using the EBI2 interface 110. In this prior architecture 100, an ARM core 104 within the MSM 102 executes the FLO physical layer software. The FLO physical layer software running on the ARM core 102 must configure the RDSP 106 with firmware instructions and the FLO hardware 108 with hardware configurations. In this architecture, the EBI2 interface was able to provide real time write transactions to enable the MSM and UBM2 chips to interface properly.

With the advent of new MSM chipsets, the option of using EBI2 no longer exists due to many factors, such as non-existence of EBI2, contention of using EBI2 for UBM2 along with other peripherals, etc. In such scenarios, an attractive reliable alternate interface that is supported on both MSMs and the UBM2 chip is the SDIO interface.

The SDIO interface is an industry standard data exchange interface that supports two forms of data transfer, one being the single access and the other being the block or burst access. The disadvantage of the SDIO single access mode is that it takes a relatively long time to set up the data interface compared to that of other high speed interfaces, such as the EBI2. This long access time can be attributed to the setup time involved with the SDIO access. The burst access mode of the SDIO interface is much faster when compared to the single (i.e., byte) access mode because it uses the hardware direct memory access (DMA) engine to do the actual transfer. Despite the long setup time, the data transfer is so fast that it can perform better than the EBI2 access for large data transfers. However, there is an inherent setup cost involved in using the DMA engine which can result in diminishing to negative returns for small transactions (i.e., data transfers). The problem with the FPS software is that, currently most of the hardware accesses, especially writes, are done to non-contiguous hardware registers. Access writes to non-contiguous registers over an SDIO interface resemble single access SDIO transactions. Given the relatively long time required to complete single access transactions, many real time requirements of the FPS would break.

Under such scenarios, one alternative would be to convert such random single transactions into burst transactions. But burst transactions require a contiguous memory space. Since the hardware registers to be programmed for any given scenario in an FPS software configuration do not present a contiguous memory map to software, the burst access protocol of the various embodiments may be used to program these random lists into contiguous blocks that can be stored in the RDSP memory and that the RDSP can parse to write particular values to the appropriate hardware registers.

Since the RDSP resides alongside the FLO hardware on the UBM2 chip, the time required to program the FLO hardware from the RDSP does not pose an issue. Thus, the RDSP may be used to program the FLO hardware (e.g., store appropriate data within particular registers). However the values to be programmed in to the hardware have to come from the ARM, since the ARM executes the FPS software which determines the values that need to be programmed into particular hardware registers. If the ARM was to transfer the complete information to the RDSP regarding the registers to be programmed along with the values to be programmed, such transfer operations would be prohibitively expensive because the ARM would end up sending more data to the RDSP than it would have done for programming the hardware registers directly. Hence the ARM-to-RDSP interface should allow for most of the information to be sent upfront (e.g., during power up, initialization or during a period of little activity) when there are no real-time constraints, and only send critical selection parameters to the RDSP when real time processing kicks in. The physical layer system hardware registers typically must be reconfigured or reprogrammed from time to time due to factors such as fine tuning, field test results, discovery of hardware limitations, etc. The biggest bottleneck in completing such reconfigurations is the effort in rewriting firmware if any of the factors mentioned above change. In other words, a firmware implementation that hard codes the hardware registers to be programmed, the sequence to be used, and possibly the values to be programmed would require a rewrite of the code at a later date. These factors require an interface between the MSM and UBM chips that allows the ARM to generically notify the RDSP of what needs to be programmed, the sequence of programming that should be implemented, the indices of registers to be programmed, and the values to be programmed. Some hardware register writes/write sequences need to be followed up with an arbitrary delay before the next write is performed. Thus, a mechanism is needed to insert such delays between writes as required.

The burst access protocol of the various embodiments addresses these design requirements to provide a generic interface in firmware. This generic interface of the burst access protocol may include a static interface and a dynamic interface, as well as control and signaling interfaces. The static interface provides a mechanism and storage for transferring most of the data and instructions required for a firmware initialization. The dynamic interface provides a mechanism and storage for transferring minimum information required for programming hardware when real time requirements kick in. The burst access protocol also provides an interface for a first processor to generically inform a second processor of the list of hardware registers to be programmed. The burst access protocol also provides an interface for the first processor to generically inform the second processor of the sequence in which hardware registers should be programmed. The burst access protocol also provides an interface for the first processor to generically inform the second processor of the possible sets of values to program for hardware registers in a time efficient manner. The burst access protocol also and provides an interface for the first processor to generically inform the second processor of a delay instruction to be inserted in between hardware writes along with a value for the number of cycles to delay. These interfaces together are referred to herein as the burst access protocol.

Figure 2:
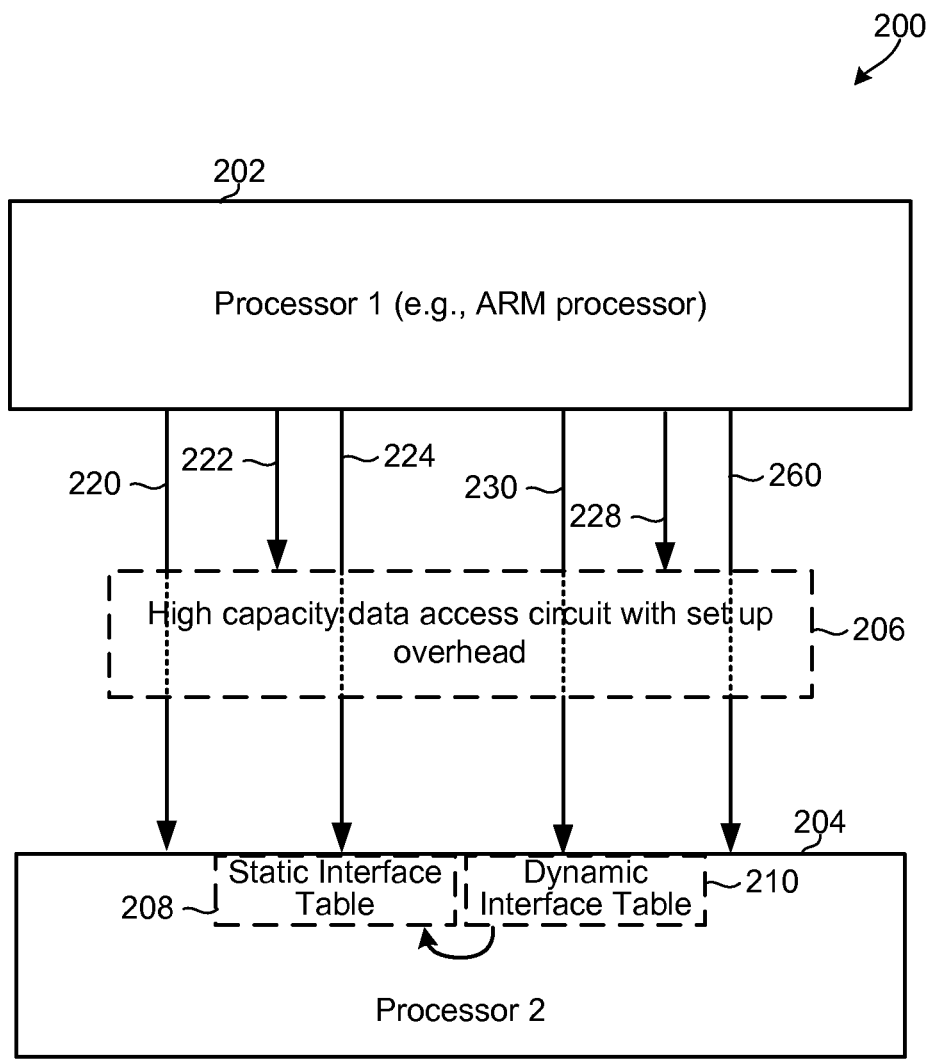
FIG. 2 is a hardware architecture diagram of two processors interfaced by a high capacity data interface that would present a communication bottleneck if all data accesses were performed in a single access mode.

FIG. 2 illustrates a hardware architecture 200 for use with the burst access protocol of the various embodiments. A hardware architecture 200 suitable for use with the burst access protocol will typically involve a first processor 202, such as an ARM processor or processor core, that communicates data and/or instructions to a second processor 204 via a high-capacity data access circuit 206 that features an access set up process which may present a communication bottleneck, such as an SDIO interface. In such an architecture, the first processor 202 may need to pass configuration data, such as hardware and firmware initialization and configuration data for program registers, to the second processor 204. The burst access protocol enables the first processor 202 to pass most of the required information regarding programming of the registers to the second processor 204 during initialization, and to pass only the minimum information thereafter when real-time considerations kick in. To enable this, initialization data and instructions may be transferred from the first processor 202 to the second processor 204 for storage in a static interface 208, and runtime parameters (e.g., instruction sequences and data only available at runtime) may be transferred from the first processor 202 to the second processor 204 for storage in a dynamic interface 210. The static interface 208 may allow the first processor 202 to send to the second processor 204 information regarding the hardware registers to be programmed, alternative programming sequences, and alternative possible sets of values to choose from for programming each hardware register.

FIG. 2 also illustrates communications between the first and second processors 202, 204 that are part of the burst access protocol. For example, the first processor 202 may communicate in signal 220 to processor 204 information (i.e., table parameters) regarding the table that is about to be transferred via the access circuit 206. For example, before transmitting the static table, the first processor 202 may send a signal 220 that informs the second processor 204 that the static table is about to be communicated as well as information that the second processor 204 requires to properly receive and store the table in memory, such as the length of the table. The table parameters signal 220 may be sent via the access circuit 206 or via a different circuit between the first and second processors. The first processor 202 may initialize the access circuit 206, as shown in arrow 222, and then transmit the static table in a single large data transfer 224. The second processor receives the static table and stores it within the static interface table portion of memory 208. Later, such as during runtime, the first processor 202 may perform a similar operation to transmit the dynamic table, by sending a signal 260 to the second processor 204 informing it that a dynamic table is about to be transmitted along with the table parameters required for reception and storage. The first processor 202 may then configure the access circuit 206 (as indicated by arrow 228) and then transmit the dynamic table in message 230. The second processor 204 receives the dynamic table and stores it within the dynamic interface table portion of memory 210.

Figure 3:
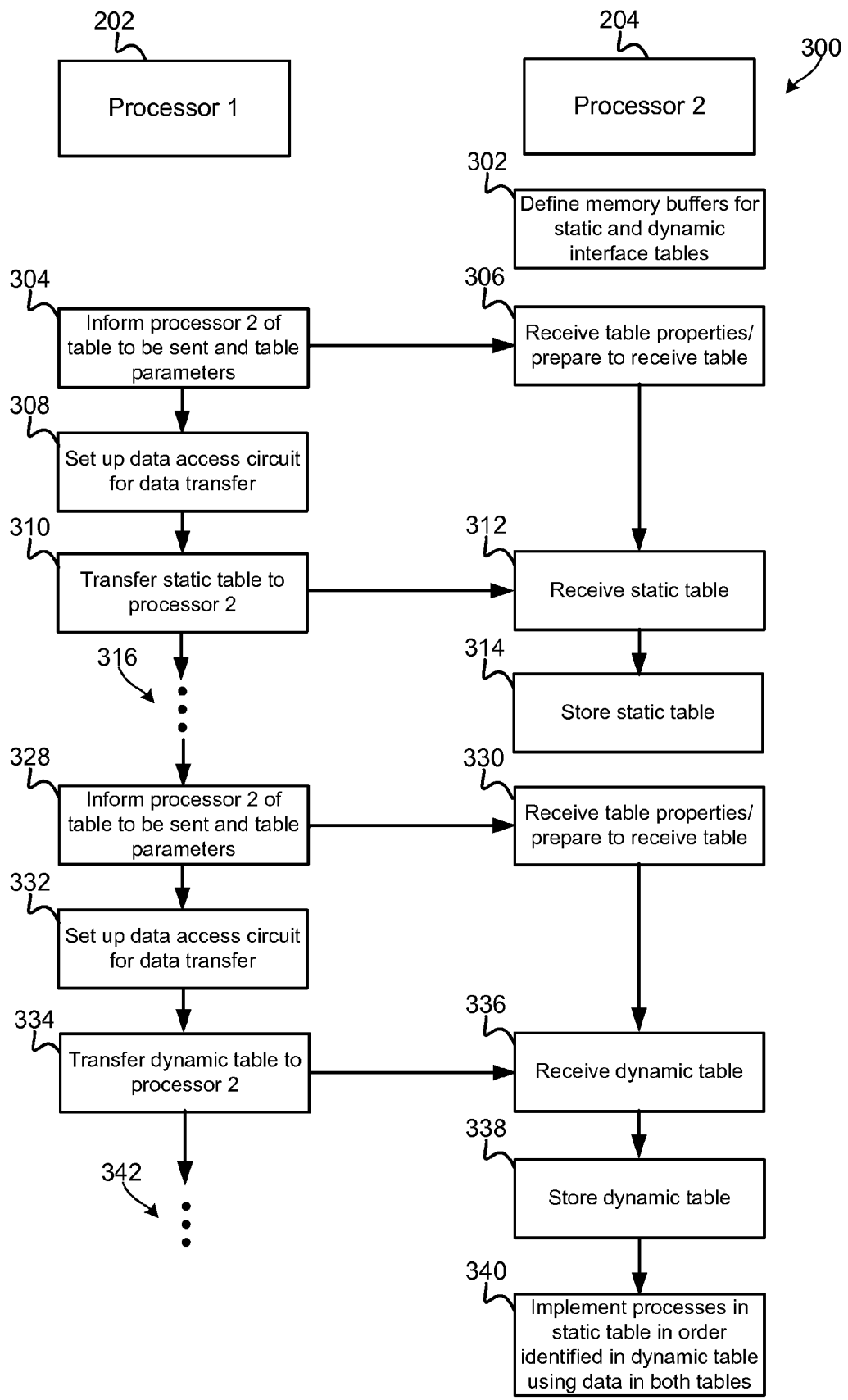
FIG. 3 is a process flow diagram of an embodiment method for communicating instructions and data between two processors using a burst access protocol according to the various embodiments.

FIG. 3 illustrates an example method 300 for implementing the burst access protocol between a first processor 202 and a second processor 204. If the second processor is not preconfigured for such an operation, an initiation process may define memory buffers for the static and dynamic interface tables in step 302. To program the second processor 204, or circuits or registers controlled by the second processor 204, the first processor 202 may inform the second processor that a static table is about to be sent along with the table's parameters, step 304. The second processor receives this information in step 306 and prepares to receive the static table. The first processor 204 may initiate the data write set up sequence to configure the access circuit for transferring the static table in step 308. Once the access circuit is set for transferring data, the first processor may initiate transfer of the static table to the second processor in step 310. The second processor 204 receives the static table in step 312, and stores the table in the static interface portion of memory coupled to the second processor in step 330. The first processor may conduct other operations 316 until such time that a run time configuration of the second processor 204, or circuits controlled by the second processor, needs to be accomplished. At that point, the first processor 202 may send a message to the second processor 204 informing it that a dynamic table is about to be transmitted, along with the table parameters required for receiving and storing of the data in step 328. The second processor 204 receives the table properties and prepares to receive the dynamic table in step 330. The first processor 202 sets up the data access circuit for transferring the dynamic table in step 332, and transfers the dynamic table to the second processor in step 334. The second processor 204 receives the dynamic table via the access circuit in step 336, and stores the dynamic table in the dynamic access portion of memory in step 338. In step 340, the second processor 204 implements the processes directed by the first processor by using information stored in the dynamic table to determine the sequences, data tables, or processes stored in the static table that should be executed, including the sequence in which multiple processes should be at executed, along with the data stored in the static table that should be used in the processes, such as to configure registers. Thus, the second processor 204 is configured with software to use information stored in the dynamic table to perform operations and configure registers using information in the static table as if the first processor were transferring information to the second processor in a sequence of single access operations.

The burst access protocol may be implemented using a variety of interrupts and message resources that are shared between the first and second processors to support transferring data from one to the other. Such interrupts and shared resources will depend upon the status registers included within the first and second processors or the functional chips in which the first and second processors reside. To provide an example of such interrupts and shared resources, the following description refers to the MSM-to-UBM2 architecture 400 illustrated in FIG. 4.

Figure 4:
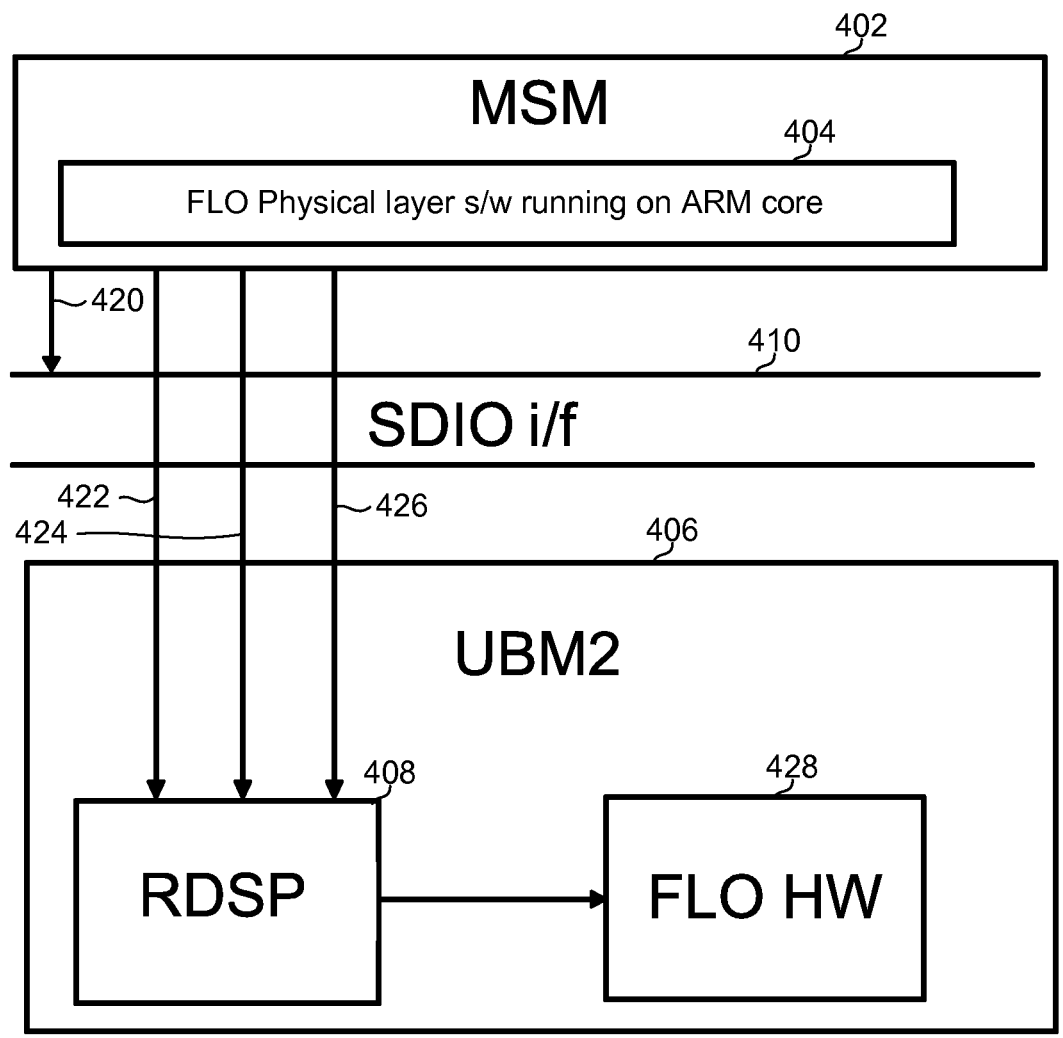
FIG. 4 is an example hardware architecture diagram of a data interface between a mobile subscriber modem and a UBM2 mobile television receiver chip implementing the burst access protocol of the various embodiments.

Referring to FIG. 4, the MSM-to-UBM2 architecture 400 may include an MSM chip 402 which features an ARM core 404 that operates the FLO physical layer software and sends configuration instructions to the RDSP 408 within the UBM2 via an SDIO interface 410. In this architecture, the ARM core 404 may configure the SDIO interface in message 420 using the bus access layer. In message 422, the ARM core 404 may configure the RDSP 408 and necessary RDSP dependencies. In message 424, the ARM core 404 may download the firmware and configuration parameters in the static table for storage within the RDSP memory. In message 426, the ARM core 404 may download the dynamic table providing the RDSP 408 with all of the necessary runtime parameters. The RDSP 408 may then run the firmware using the dynamic table to determine the information from the static table necessary to program the FLO hardware 428.

The UBM2 hardware 406 may include a dedicated bit in the interrupt status register to identify an interrupt fired by the RDSP 408. In this example architecture, the floSWCmd-Response RDSP register may be used to distinguish between various RDSP interrupts. Similarly, the RDSP driver, which is maintained on the ARM processor 404, may include a mechanism (on the ARM) to generate a software interrupt to the RDSP 408. The floSWCmd RDSP register is used by the RDSP 408 to identify the type of interrupt fired by the ARM 404. The following table 1 describes ARM interface interrupts that may be implemented with the burst access protocol in the architecture illustrated in FIG. 4.

RDSP 408 for programming of the UBM2 hardware using the burst access capabilities of the SDIO interface 410. In the example architecture illustrated in FIG. 4, the static interface may be an open buffer of length 2000 in MEMC (32 bit) RDSP memory, although larger or smaller buffers may be utilized. This memory may be packed by the ARM 408 with consecutive tables in a specific format. Each table may contain a list of hardware registers in sequence that are tied together by a common criteria that selects a specific value from a range of possible values for that given register, e.g., FFT-CP combinations. By formatting the programming data contained in the static access in this manner, a wide range of different configurations may be accommodated. Such criteria will support a wide range of values for each register. For example, 4kFFT-1/8CP might mandate that a certain hardware register should be programmed with a value X, whereas an 8KFFT-1/4CP might need a programming of value Y. The format of the tables may be described by the following C expression:

```
GenericBAPStaticTable
{
    NumRegisters,
    MaxIndex,
    HWRegisterAddress[NumRegisters],
    RegValuesArray[NumRegisters * MaxIndex]
}
```

If a given configuration scenario requires a certain set of hardware registers tied to a certain criteria (e.g., set1) to be programmed in a particular sequence followed by another (e.g., set2), and so on until setN, the static interface programming may be accomplished by packing and programming table1 followed by table2 and so on until tableN, and storing the tables in sequence within the static interface memory buffer. In such an implementation, the RDSP 408 would only need to be informed of the start address of the burst access protocol array and its total size. All information regarding the burst access protocol tables may be maintained by the ARM 404. Thus, a register interface for enabling the ARM 404 to

TABLE 1

RDSP - ARM Interface Interrupts

| Interrupt name | Fired By | Description |
| --- | --- | --- |
| RDSP_to_micro_irq | RDSP | This interrupt is fired by RDSP to the ARM when it has completed all of its processing. When ARM receives this interrupt it reads the RDSP command response register (floSWCmdResponse) to determine which command was completed by the DSP. 0x107 - BAP request successful 0x108 - BAP request unsuccessful (Error code register specified in the interfaces) |
| micro_to_rDSP_cmd_irq | ARM | This interrupt is fired by ARM when it has a command ready for the RDSP to process. The command would be set by ARM in the floSWCommand register, which the RDSP would fetch to determine which command it needs to process. 0x2 - MFTYPES_RDSP_Process_BAP_CMD |

The static and dynamic interfaces of the burst access protocol enable the ARM 404 to transmit hardware writes to the program the burst access protocol static interface table may be those values listed in Table 2 below.

TABLE 2

DSP - ARM Register Interface for Static BAP Table Programming

| Register | Access Type | Bit Width | Contents |
|---|---|---|---|
| FLO_bapStaticTableArrayStartAddress | R | 32 | This register may specify the start address of the 32 bit static BAP array in the RDSP. |
| FLO_bapStaticTableArrayMaxSize | R | 32 | This register may specify the maximum length for the BAP static table allocated in the RDSP. |

Once the static tables are programmed into the RDSP 408 using the static interface, the bulk of the information transfer is complete. Before initiating a burst access protocol transaction, the software executing within the ARM 404 may determine the appropriate set of values to be programmed into hardware of the UBM2 406. Since the various possible data sets already exists in the static table within the RDSP memory, the ARM 404 only needs to inform the RDSP 408 of which indexes to use in each table within the static interface table. Since the number of tables within the static interface table programmed by the ARM 404 is dynamic (i.e., the ARM 404 can specify as many tables as necessary in the static interface as long as the tables fit within the 2000 long memory allocation provided by the RDSP 408), the number of indices to be provided to access the static tables may be dynamic as well. Thus, the burst access protocol provides a very flexible programming capability. As a practical consideration the dynamic interface may be designed to allow up to 50 indices, although this number can be changed as needed.

An example format of the dynamic interface suitable for use with the architecture illustrated in FIG. 4 is described in the following C expression:

```
BAPDynamicInterfacePacket
{
  FLO_bapTransactionNumTables,
  FLO_bapTransactionTableOffsetsArray[FLO_bapTransactionMaxNumTables],
  FLO_bapTransactionStaticTableIndicesArray [FLO_bapTransactionMaxNumTables]
// Where FLO_bapTransactionMaxNumTables is defined as 20
}
```

While the ARM 404 can fill any existing static table address offsets to the FLO_bapTransactionTableOffsetsArray locations, one new reserved table offset may be introduced to address the configurable delays required between hardware writes. The ARM 404 can use this special offset to indicate to the firmware that it requires special delay processing. When using this special offset, the corresponding index value set in FLO_bapTransactionStaticTableIndicesArray may indicate the delay value.

A register interface for enabling the ARM 404 to program the burst access protocol static dynamic table may be those values listed Table 3 in below.

TABLE 15

DSP - Arm register interface for dynamic BAP programming

| Register | Access Type | Bit Width | Contents |
|---|---|---|---|
| FLO_bapTransactionMaxNumTables | RW | 16 | This register specifies the maximum number of tables that can be programmed in one BAP transaction |
| FLO_bapTransactionNumTables | RW | 16 | This register will be used to specify the number of tables to be programmed by the RDSP (to the UBM HW) in a given BAP transaction. Reset to 0 on completion of a BAP transaction |

TABLE 15-continued

DSP - Arm register interface for dynamic BAP programming

| Register | Access Type | Bit Width | Contents |
| --- | --- | --- | --- |
| FLO_bapTransactionTableOffsetsArray | RW | 16 | This 16 bit array will contain offsets to each of the tables (from the static table start address) to be programmed in a given BAP transaction (FLO_bapTransactionNumTables) Reset to 0 on completion of a BAP transaction |
| FLO_bapTransactionStaticTableIndicesArray | RW | 16 | This 16 bit array will contain an index for each corresponding table entry in the FLO_bapTransactionTableOffsetsArray Reset to 0 on completion of a BAP transaction |

Steps that may be taken to make use of the burst access protocol for programming burst non-conducive hardware registers may involve the following. As part of the configuration or initialization process for the second processor, memory may need to be allocated for the static and dynamic interfaces, and registers for the first processor to access interface locations may need to be declared and exported. Additional software command codes may be required for the first processor to use to interrupt the second processor and notify it of pending hardware writes for the burst access protocol. Command parsing logic may be added to detect burst access protocol commands and invoke the burst access protocol based hardware programming module. Top level burst access protocol parsing logic may be added that can parse the burst access protocol dynamic interface packet and invoke hardware programmer logic for each table. Generic hardware programmer logic may be added that can program hardware registers generically given a pointer to a static table (e.g., a table within the static interface table) and an index to use for that table. Task completion logic may be added that can fire the appropriate interrupt to the first processor upon completion of programming in the second processor. Test framework may be added to test and debug the generic programmer. Logging support may be added if needed to capture the algorithm sequence and/or results.

The following provides an outline of steps that a software developer could take to implement a burst access protocol. A software developer may identify a list of registers, sequence of programming, and values to program. The developer may create tables based on the information gathered from the system team that conform to the static interface. The developer may also identify programming sequences in existing software-hardware interactions, where the hardware programming through the second processor needs to be accomplished. Logic may be added to an application to determine the index to be used to select the appropriate values in each table based on different operating modes and any other criteria that form the indices into the tables. The developer may interlace required time delays using the reserved table offset along with the delay values as indices and pack the computed indices into the dynamic interface as described above. The command code in the second processor server software command interface register (e.g., FLO_floSWCommand) may be set to fire an interrupt to the second processor to initiate hardware programming. The developer may handle burst access protocol programming completion interrupts back from the second processor when it is done programming the hardware and continue the sequence to be followed after hardware programming. Logging support may be added to the application as needed.

Figure 5:
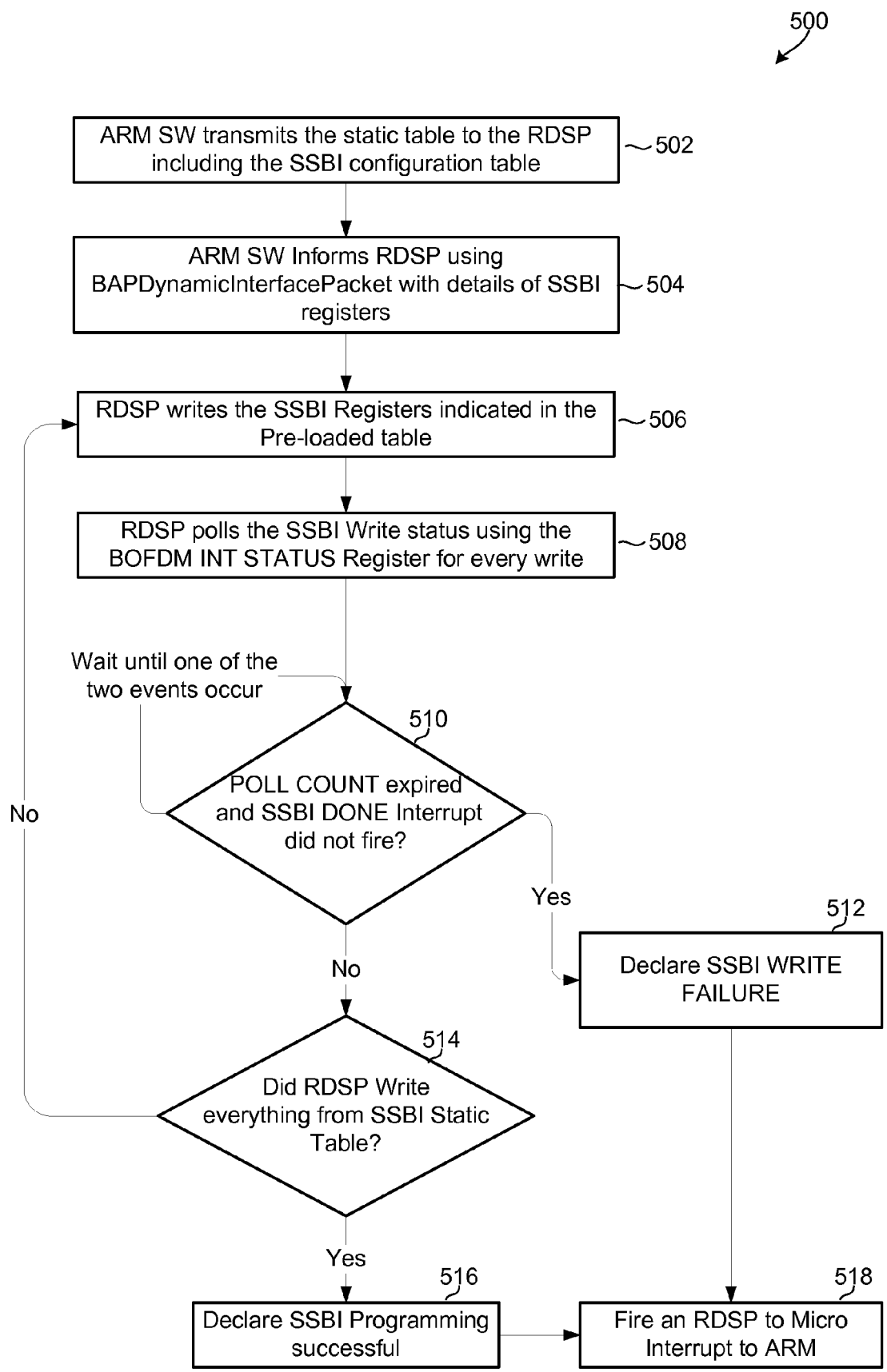
FIG. 5 is a process flow diagram of an embodiment method for writing data from a first processor to a second processor using the burst access protocol of the various embodiments.

FIG. 5 illustrates an example method 500 for the ARM 404 to program the RDSP 408 to configure single wire serial bus interface (SSBI) registers. In method 500 in step 502, the ARM 404 software may transmit the static table to the RDSP 408 including the SSBI configuration table. In step 504, the ARM 404 may inform the RDSP 408 using a burst access protocol dynamic interface packet about the details of the SSBI configuration table. In step 506, the RDSP 408 may use the information in the static table to write data into the SSBI registers. In step 508, the RDSP may poll an SSBI write status register for every write operation. In determination step 510, the RDSP may determine whether the poll count has expired and the SSBI DONE interrupt has not fired. If these conditions are met (i.e., determination step 510="YES"), this indicates a writing failure, so the RDSP may declare an SSBI write failure event in step 512, and send an interrupt to the ARM 404 in step 518. If the tested conditions are not met (i.e., determination step 510="NO"), the RDSP 408 may determine whether the RDSP has written every value from the SSBI static table into the SSBI registers in determination step 514. If the RDSP 408 has not yet written everything from the SSBI static table (i.e., determination step 514="NO"), the RDSP 408 may continue the process of writing the SSBI registers indicated in the preloaded tables by returning to step 506. Once the RDSP has written everything from the SSBI static table into the SSBI registers (i.e., determination step 514="YES"), the RDSP may declare a SSBI programming successful condition in step 516, and send an interrupt to the ARM 404 in step 518.

Figure 6:
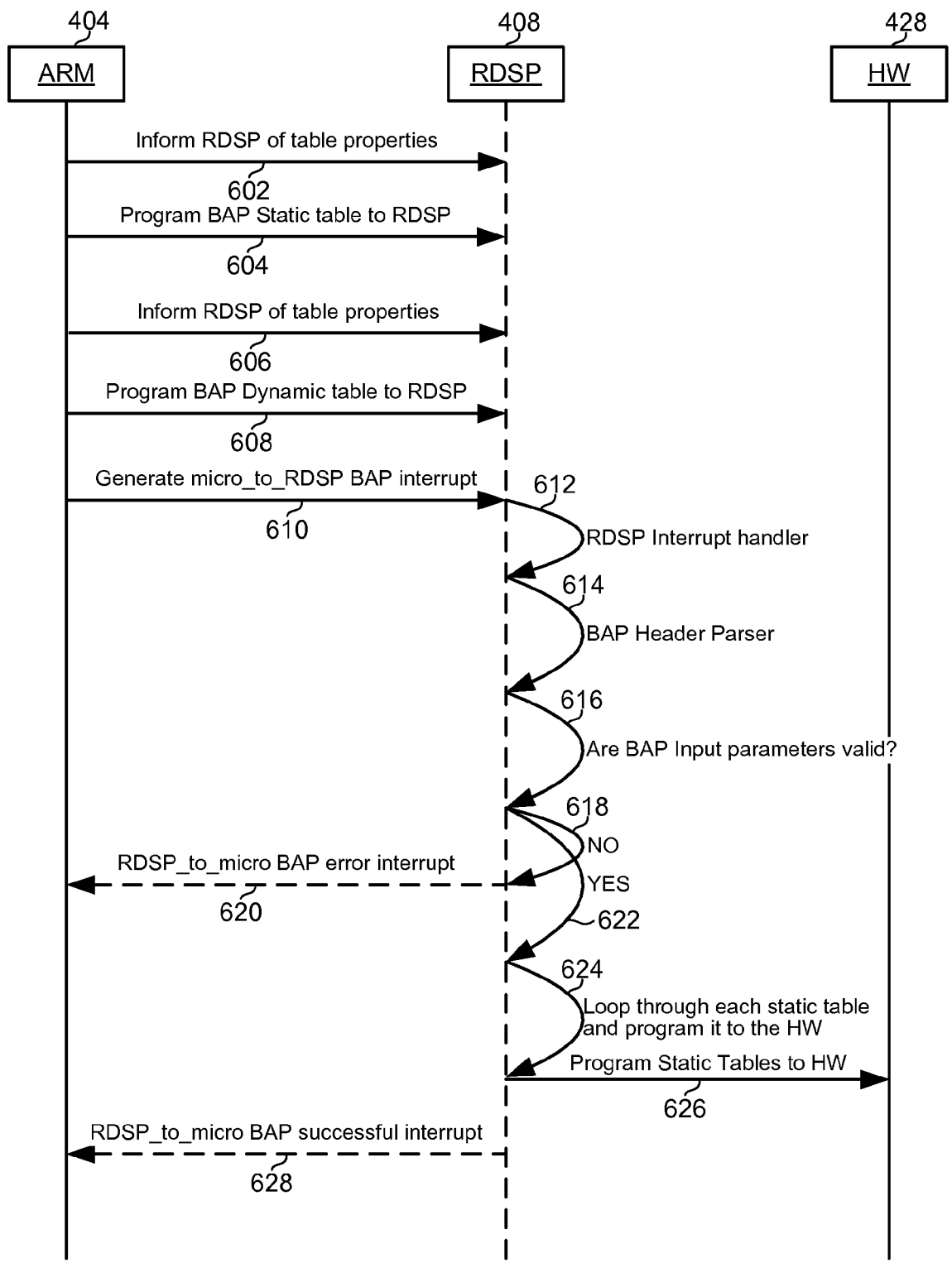
FIG. 6 is a call flow diagram showing communications and processes that may be implemented in the example hardware architecture illustrated in FIG. 4 using the burst access protocol of the various embodiments.

FIG. 6 illustrates an example of call flows that may be implemented in the architecture illustrated in FIG. 4 using the burst access protocol. The ARM 404 may send a message 602 to the RDSP 408 informing it of the properties of a static table that is about to be transmitted. In message 604, the ARM 404 may download the static table to the RDSP 408 which stores the table in the static interface buffer portion of memory. At a later point in time, such as during a runtime event, the ARM 404 may send message 606 to the RDSP 408 informing it that the dynamic table is about to be transmitted, including table properties required for the RDSP to receive the dynamic table. Thereafter, the ARM 404 may download the dynamic table to the RDSP 408 in message 608. Once the dynamic table has been downloaded to the RDSP 408, the ARM 404 may generate an interrupt 610 to the RDSP 408 to cause it to implement the programming defined in the dynamic and static interface tables. The RDSP 408 may respond to this interrupt by an appropriate RDSP interrupt handler 612. The RDSP 408 may then implement a burst access protocol header parser 614, and determine whether the burst access protocol input parameters are valid in processes 616. If the burst access protocol parameters are invalid, process 618 may generate an error interrupt 620 that is transmitted to the ARM 404. If the burst access protocol parameters are determined to be valid, process 622 may initiate an operations loop 624 that loops through different data structures of the static table according to the sequence defined in the dynamic table to program data stored in the static table into indicated registers of the FLO hardware 428 in a series of write operations 626. Once this programming has been completed, the RDSP 408 may send an interrupt 628 to the ARM 404 to inform it that the programming has been successful.

Figure 7:
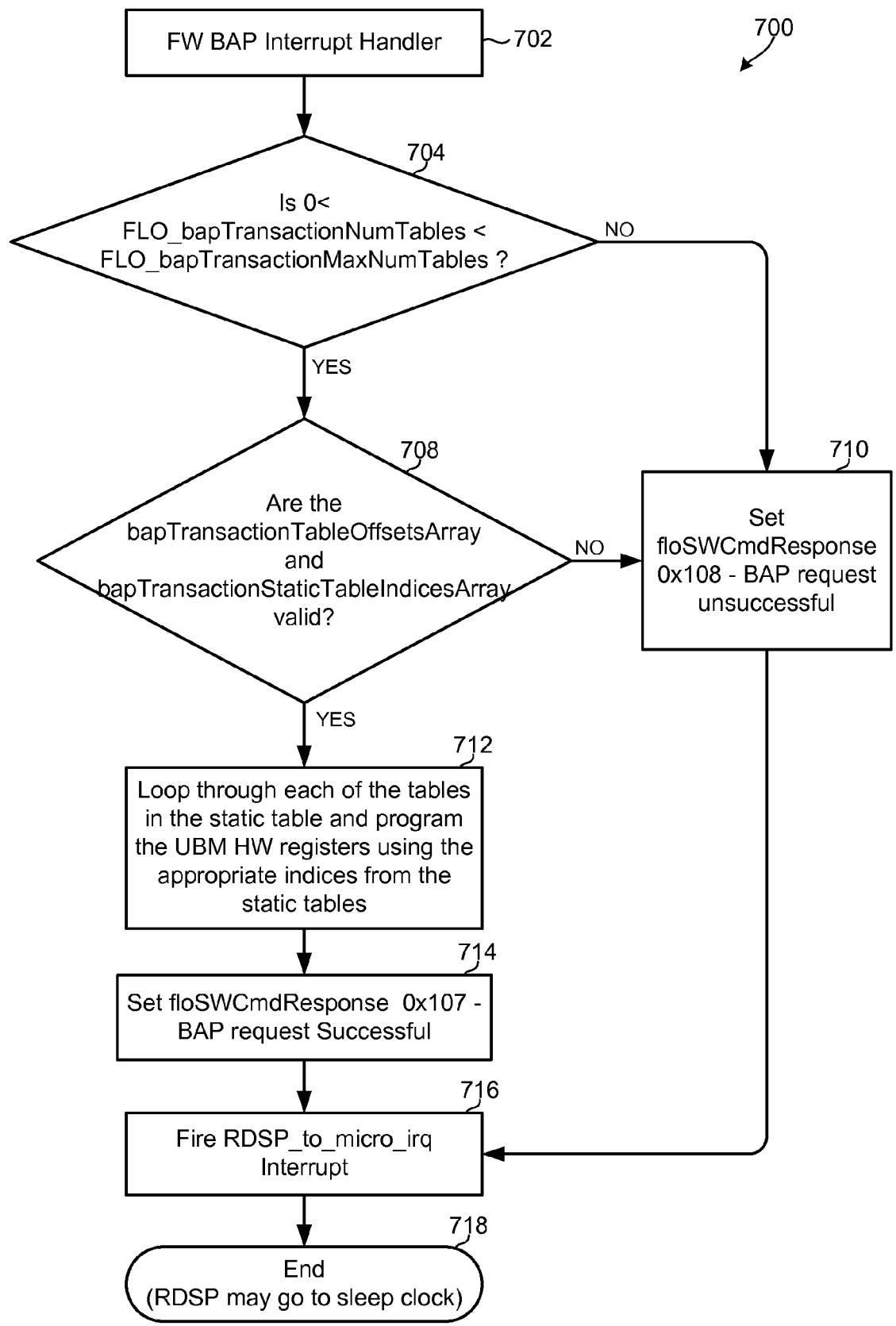
FIG. 7 is a process flow diagram illustrating a method for handling error messages associated with a data table write access using the burst access protocol of the various embodiments.

FIG. 7 illustrates an example method 700 that may be implemented in the architecture illustrated in FIG. 4 for programming FLO hardware 428 using the burst access protocol. When the RDSP 408 receives an interrupt 610 from the ARM 404 informing it that the dynamic table has been downloaded and the programming operation can begin, step 702, the RDSP 408 may determine whether the number of tables within the static interface is within the acceptable parameters, such as greater than zero and less than a maximum number in determination step 704. If the number of tables within the static interface is outside the acceptable parameters (i.e., determination step 704="NO"), the RDSP 408 may store a value to a register or variable (e.g., the "floSWCmdResponse" value) that indicates that the burst access protocol request was unsuccessful, step 710. When the value indicating an unsuccessful request is stored in the appropriate register or variable, the RDSP 408 may fire an interrupt in step 716 to inform the ARM 404 that it should check the success/failure register or value, before ending the process in step 718.

If the number of tables within the static interface is within the acceptable parameters (i.e., determination step 704="YES"), the RDSP 408 may determine whether the static table offsets and static table indices contained within the dynamic interface are valid in determination step 708. If either of the table offsets or table indices are invalid (i.e., determination step 708="NO"), the RDSP 408 may store a value to a register or variable (e.g., the "floSWCmdResponse" value) that indicates that the burst access protocol request was unsuccessful, step 710. When the value indicating an unsuccessful request is stored in the appropriate register or variable, the RDSP 408 may fire an interrupt in step 716 to inform the ARM 404 that it should check the success/failure register or value, before ending the process in step 718.

If the table offsets and table indices are valid (i.e., determination step 708="YES"), the RDSP may execute the processes of step 712 to loop through each of the indicated tables in the static table and program the hardware 428 registers using the appropriate indices and data specified in the static table. Once all of the hardware registers have been properly program in step 712, the RDSP 408 may store a value to a register or variable (e.g., the "floSWCmdResponse" value) that indicates that the burst access protocol request was successful, step 714. When the value indicating that the request has been successfully completed is stored in the appropriate register or variable, the RDSP 408 may fire an interrupt in step 716 to inform the ARM 404 that it should check the success/failure register or value, before ending the process in step 718.

An exemplary application of the burst access protocol involves early configuration of a second processor by a first processor as part of the initialization sequence. Further details regarding prioritizing activation of a second processor in a multi processor device are disclosed in U.S. patent application Ser. No. 12/887,196, entitled "Methods and Apparatus for Priority Initialization of a Second Processor" filed contemporaneous with this application, the entire contents of which are hereby incorporated by reference. In this application of the burst access protocol, the control processor (e.g. the ARM 404) may be configured to program, configure and initialize the second processor (e.g. the RDSP 408) as one of the first operations in initializing device hardware. This enables the second processor to begin performing operations early in the initialization sequence. Providing a second processor operating during the initialization sequence can increase the number of operations that can be performed in a short amount of time and add additional functionality that can be leveraged during the initialization sequence. The burst access protocol enables the first processor to configure the second processor sufficiently to enable the second processor to receive the static table as one of the first operations in the initialization sequence.

Figure 8:
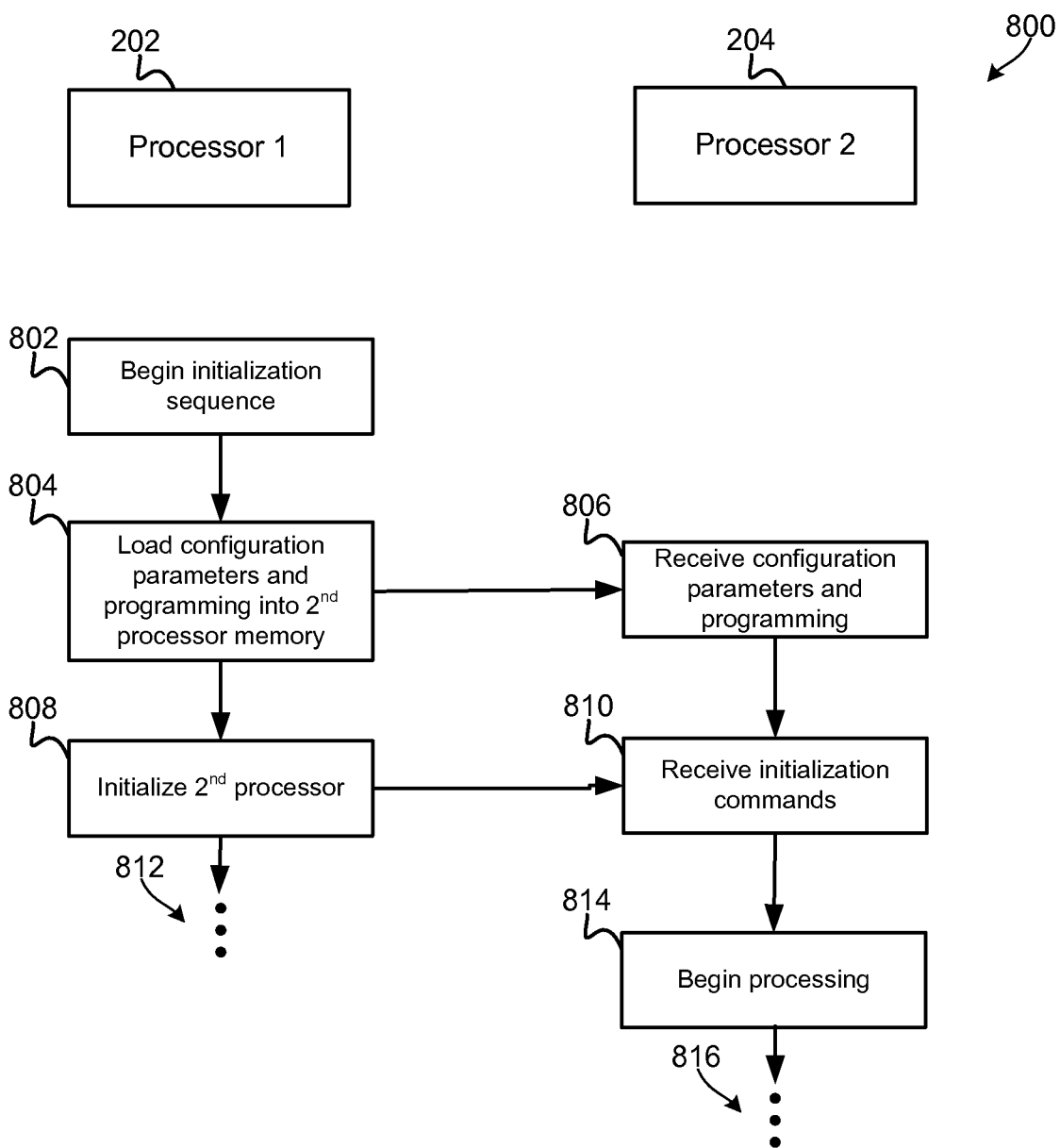
FIG. 8 is a process flow diagram of another embodiment method for programming and configuring a second processor at an early point within an initialization process managed by a first processor.

FIG. 8 illustrates an example method 800 for initializing the second processor using the burst access protocol as an early operation within the initialization sequence. In method 800 in step 802, the first processor 202 begins the initialization sequence. In step 804, the first processor 202 loads registers associated with the second processor 204 and accomplishes any other programming of the second processor 204 to enable the second processor to begin operations. In step 806, the second processor receives such programming. In step 808, the first processor 202 sends a command or other signal to the second processor 204 to cause it to begin operations. In step 808, the second processor receives the activation command, and in step 814, begins operations according to its programming. The first processor 202 may then continue with other initialization sequence processes 812, such as transmitting the static and dynamic tables of the burst access protocol to the second processor as described above with reference to FIG. 3. Similarly, the second processor 204 may perform operations, such as receiving the static and dynamic tables of the burst access protocol to the second processor as described above with reference to FIG. 3.

Figure 9A:
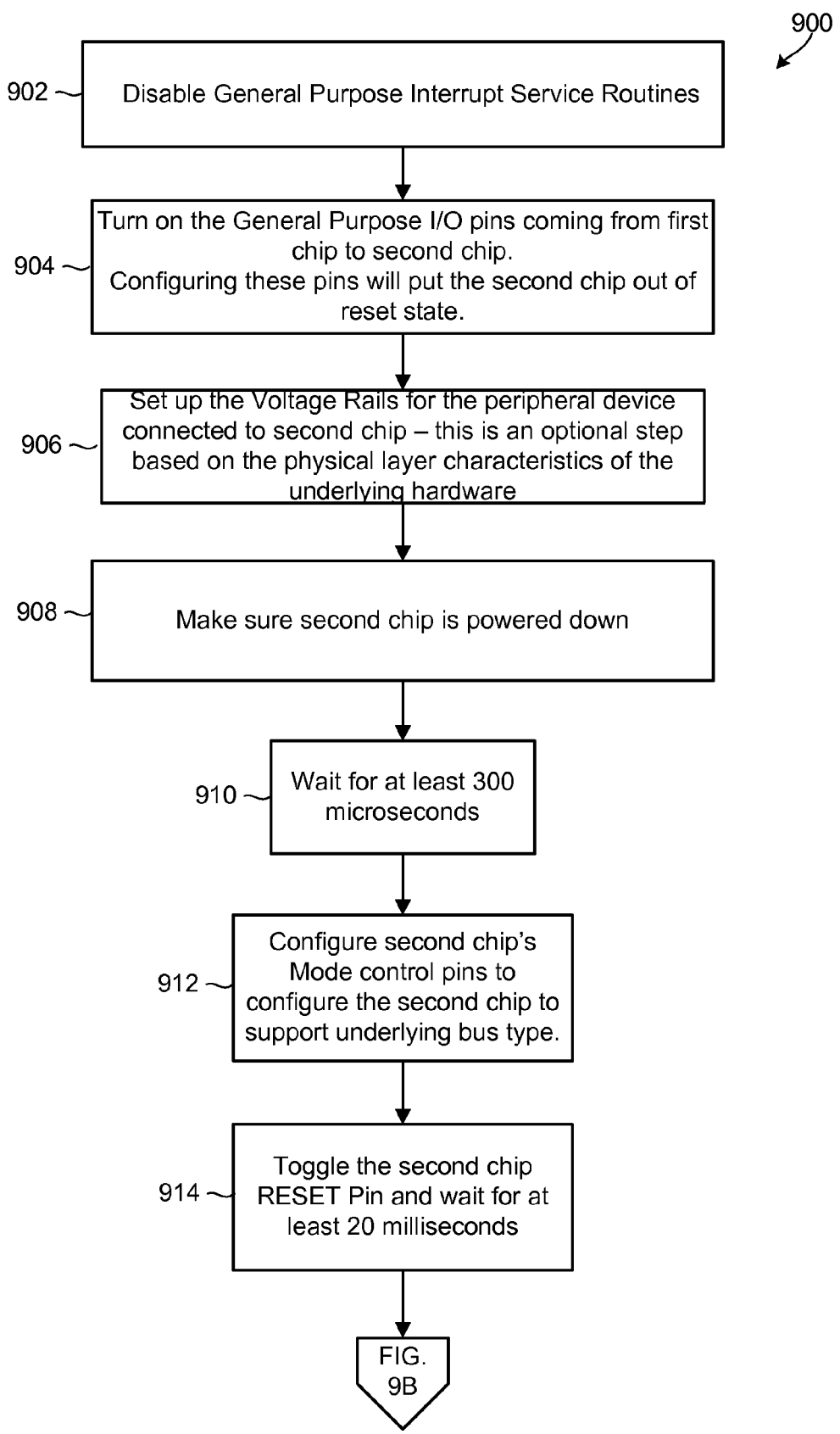
FIGS. 9A and 9B together are a process flow diagram of an example embodiment method for programming and configuring a digital signal processor within a second chip from a processor within a first chip.
Figure 9B:
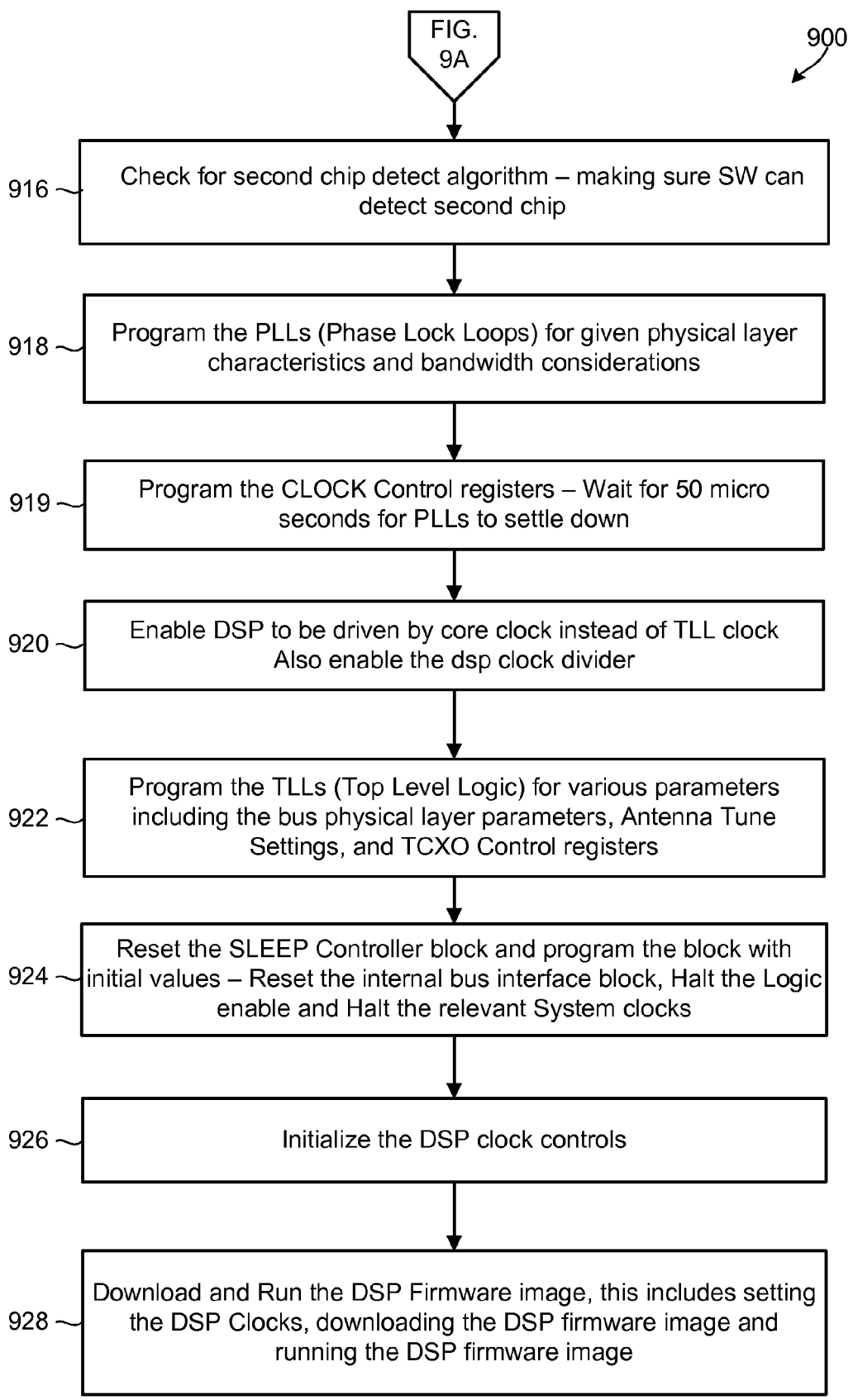

A general method for activating a second processor as an early process within an initialization routine using the burst access protocol is illustrated in FIGS. 9A and 9B. In method 900 in step 902, a first processor on a first chip may disable the general purpose interrupt service routines of a second chip. In step 904, the first processor may turn on the general purpose input/output pins between the first chip and the second chip. Configuring these input/output pins puts the second chip out of the reset state. In step 906, the first processor may set up voltage rails for a peripheral device connected to the second chip. This step may be optional depending upon the physical layer characteristics of the underlying hardware. The first processor may test to confirm that the second chip is powered down, step 908, and wait for at least 300 μs in step 910. In step 912, the first processor may configure the second chip's mode control pins and thereby configure the second chip to support underlying bus types. The second chip may be configured to match the underlying bus type beneath the first and second chip. The bus type may be one of several different varieties, including EPI1, EPI2, or other industry standards. In step 914, the first processor may toggle the second chip's reset pin and wait for at least 20 ms.

Referring to FIG. 9B, method 900 continues in step 916 where the first processor may perform a second chip detection algorithm to confirm that the software can detect the second chip. In step 918, the first processor may program the phase locked loops (PLL) for given physical layer characteristics and bandwidth considerations. The first processor program the clock control registers and wait 50 μs for the PLLs to settle down, step 919. In step 920, the first processor may enable a DSP on the second chip to be driven by its core clock instead of the TLL clock. As part of this step, the first processor may also enable the DSP clock divider. In step 922, the first processor may program the top level logic (TLL) with various parameters, including the bus physical layer parameters, antenna tune settings, and the temperature controlled crystal oscillator (TCXO) control registers. In step 924, the first processor may reset the sleep controller block, and program the block with initial values. As part of this step, the first processor may also reset the internal bus interface block, halt the logic enable, and halt the relevant system clocks. In step 926, the first processor may initialize DSP clock controls. The first processor may enable a memory pool software clock control to be controlled through the DSP software. The first processor may also disable rxfront and sampsrv clocks on the second chip in this step. In step 928, the first processor may download the DSP firmware image to the DSP and initiate processing of the firmware. This step may involve setting the DSP clocks, downloading the DSP firmware image, and activating the DSP firmware image.

Figure 10A:
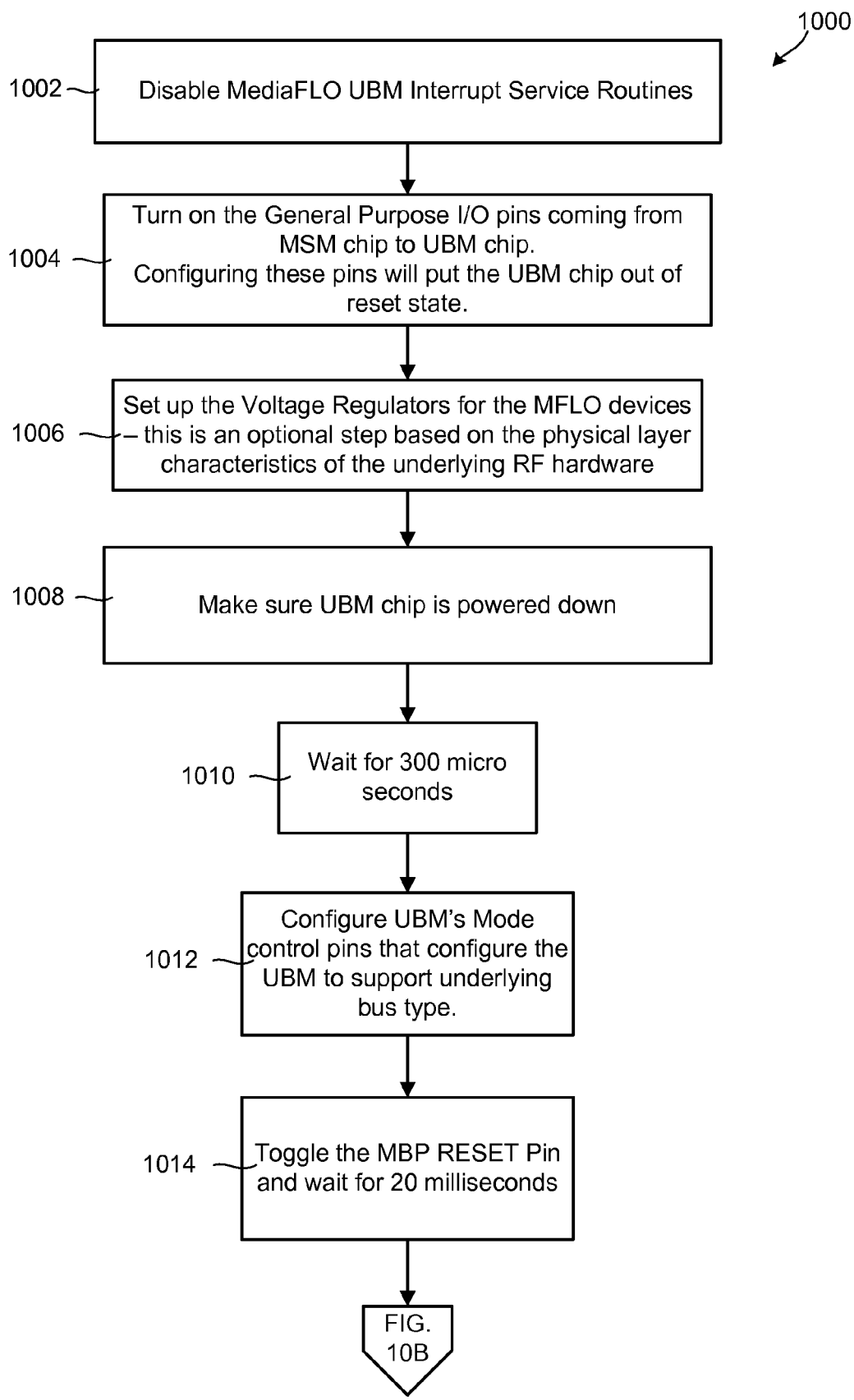
FIGS. 10A and 10B together are a process flow diagram of an example embodiment method for programming and configuring a digital signal processor within a multimedia receiver chip from a processor within a mobile station modem (MSM) chip.
Figure 10B:
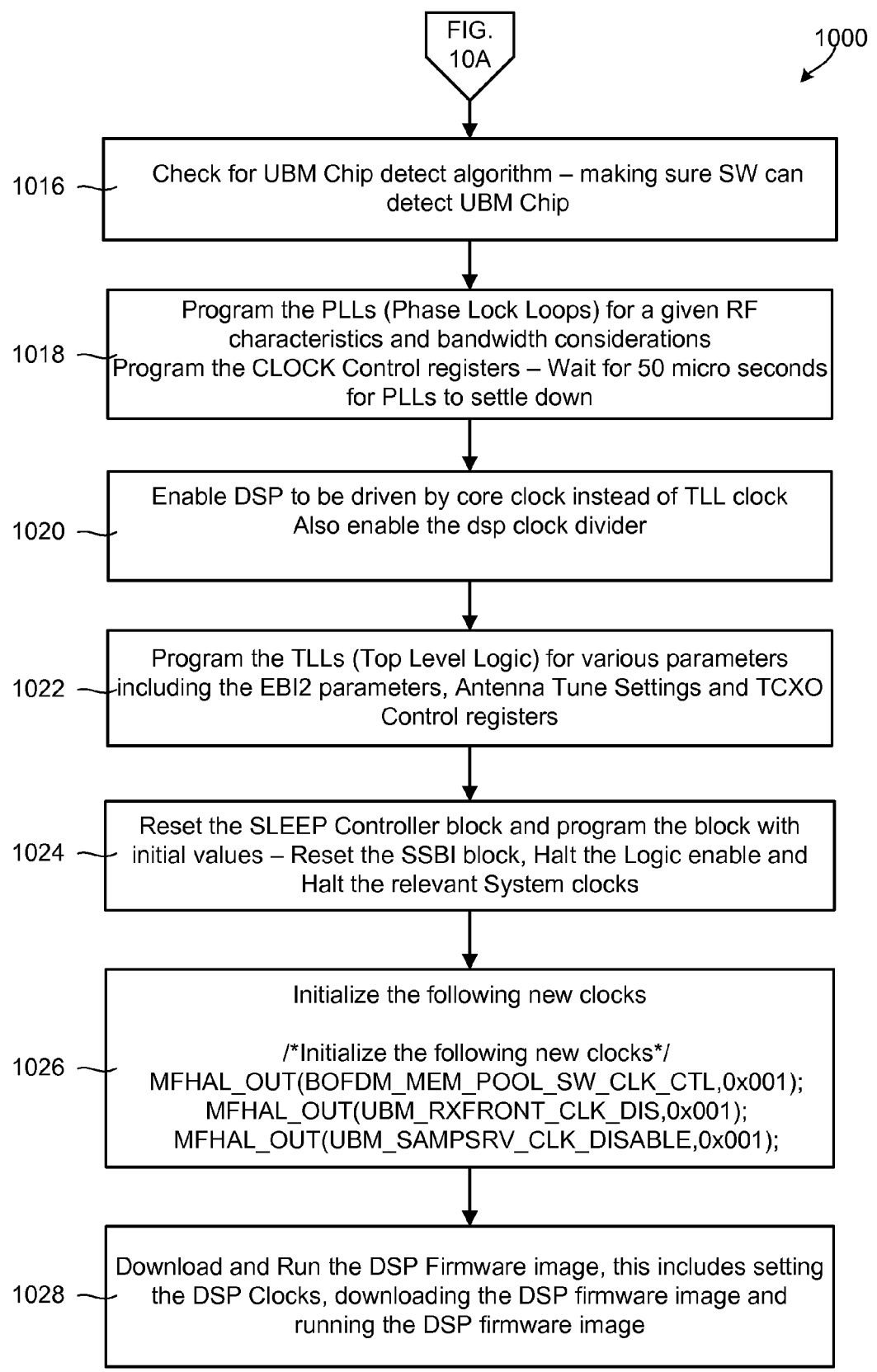

Methods for activating a second processor as an early process within an initialization routine may be further described by way of a particular example illustrated in FIGS. 10A and 10B. For MediaFLO chips, such as the UBM2 chip, the process of bringing up the chip's RDSP processor in the earliest convenient time can provide operational benefits. This is primarily because, various hardware programming tasks can be off loaded to the RDSP. Drivers for broadcast technologies like MediaFLO (e.g., DVBH) program the receiver hardware in a sequence block by block from the hardware. This block by block programming is intended to ensure that any inter-dependencies within the hardware are taken care of while programming the hardware. Conventional approaches for configuring hardware in the MediaFLO chips have programmed the RDSP in the last step of the Initialization Sequence. This conventional approach makes the RDSP available so late in the power up sequence that the functionality of the RDSP is not fully utilized. In some cases, activating the RDSP as a last step in the initialization sequence results in the processor missing time critical functions that could have been accomplished with the help of RDSP if that processor had been programmed earlier on.

There are a number of processes that the RDSP could support, such as TDM1, SPC, PPC, TPC, etc. An illustrative example of a process that the RDSP can support is the Hardware Initialization at Power up. This process involves a catch22 situation, in that the RDSP need to be up and running before ARM processor within the MSM can download tables used in the burst access protocol described herein. However, for the Power up case, the ARM processor needs to initialize the RDSP before it can transfer the static and dynamic tables to the RDSP. The conventional power up hardware initialization of the MFLO Drivers enables a number of blocks and registers before the ARM processor downloads the RDSP Firmware image. This conventional approach poses problems for burst access protocol when the static and dynamic tables may be transferred via an SDIO interface.

This embodiment provides a mechanism for fine tuning the necessary blocks and a special way of configuring them so that the RDSP can be programmed at the earliest possible time, enabling the RDSP to be initialized early and in an efficient manner. The following example identifies the hardware blocks that may be needed, and a mechanism for programming these hardware blocks, providing for the necessary settling time, downloading the RDSP firmware image, and activating the RDSP.

Referring to FIG. 10A, in method 1000 in step 1002, the ARM processor may disable the MediaFLO UBM2 chip interrupt service routines. In step 1004, the ARM processor may turn on the general purpose input/output pins between the MSM chip and the UBM2 chip. Configuring these input/output pins puts the UBM chip out of the reset state. In step 1006, the ARM processor may set up the voltage regulators for the MediaFLO devices. This is an optional step based upon the physical layer characteristics of the underlying radio receiver hardware. In step 1008, the ARM processor may test to confirm that the UBM2 chip is powered down, and wait 300 μs in step 1010. In step 1012, the ARM processor may configure the UBM2 mode control pins which configure the UBM2 to support underlying bus types. In step 1014, the ARM processor may toggle the MBP reset pin and wait 20 ms.

Referring to FIG. 10B, method 1000 continues in step 1016 where the ARM processor may perform a UBM chip detection algorithm to confirm that the software can detect the UBM2 chip. In step 1018, the ARM processor may program the phase locked loops (PLL) for given radio frequency characteristics and bandwidth considerations, and programmed the clock control registers. As part of the step, the ARM processor may also wait 50 μs for the PLLs to settle down. In the step 1020, the ARM processor may enable the RDSP to be driven by its core clock instead of the TLL clock. As part of this step, the ARM processor may also enable the RDSP clock divider. In step 1022, the ARM processor may program the top level logic (TLL) with various parameters, including the EBI2 parameters, antenna tune settings, and the temperature controlled crystal oscillator (TCXO) control registers. In step 1024, the ARM processor may reset the sleep controller block, and program the block with initial values. As part of this step, the ARM processor may also reset the SSBI block, halt the logic enable, and halt the relevant system clocks. In step 1026, the ARM processor may initialize new clocks. In the example of the UBM2 chip, such new clocks may include:

a
MFHAL_OUT(BOFDM_MEM_POOL_SW_CLK_CTL,0x001);
MFHAL_OUT(UBM_RXFRONT_CLK_DIS,0x001); and
MFHAL_OUT(UBM_SAMPSRV_CLK_DISABLE, 0x001).

In step 1028, the ARM processor may download the RDSP firmware image to the RDSP and initiate processing of the firmware. This step may involve setting the RDSP clocks, downloading the DSP firmware image, and activating the DSP firmware image.

An example sequence code for accomplishing this programming is provided below.

```
static void mfrxd_init_hw ( )
{
    mfrxd.hw_state = MFRXD_HW_INITIALIZING;
    /* Make sure no ISR cannot be invoked */
    mfhal_set_flo_hw_isr_handler( mfextern_get_flo_int0_gpio( ),
    NULL );
```

```
/* Make sure events are unmasked */
mfrxd_enable_mfrxd_events( );
/* UBM2 HW Initialization */
/* Power Up, Reset sequence for UBM1 */
mfhal_init_hw_platform( FALSE );
/* Configure EBI2 */
mfhal_init_hw_interface( pll_vals[mfconfig_data_ptr->bandwidth -
        MFTYPES_BW_5_MHZ].ebi2_setting );
/* Initialize MBP GPIOs */
mfrxd_init_mbp_gpios( );
if(! mfrxd_mbp_detect(FALSE))
{
    /** MBP Chip is not detected -- there is no point in going further thru
    the HW
Initialization process */
    mfrxd.hw_state = MFRXD_HW_UNINITIALIZED;
    return;
}
/* Program PLL */
mfrxd_init_ubm_pll( );
/* Program TLL */
mfrxd_init_ubm_tll( );
/* Initial wakeup of UBM */
mfrxd_init_ubm_wakeup( );
/**
 * Download the DSP ahead of the rest of the blocks for Burst
 * Access Protocol implementation
 */
mfrxd_download_and_run_dsp_firmware( );
```

Figure 11:
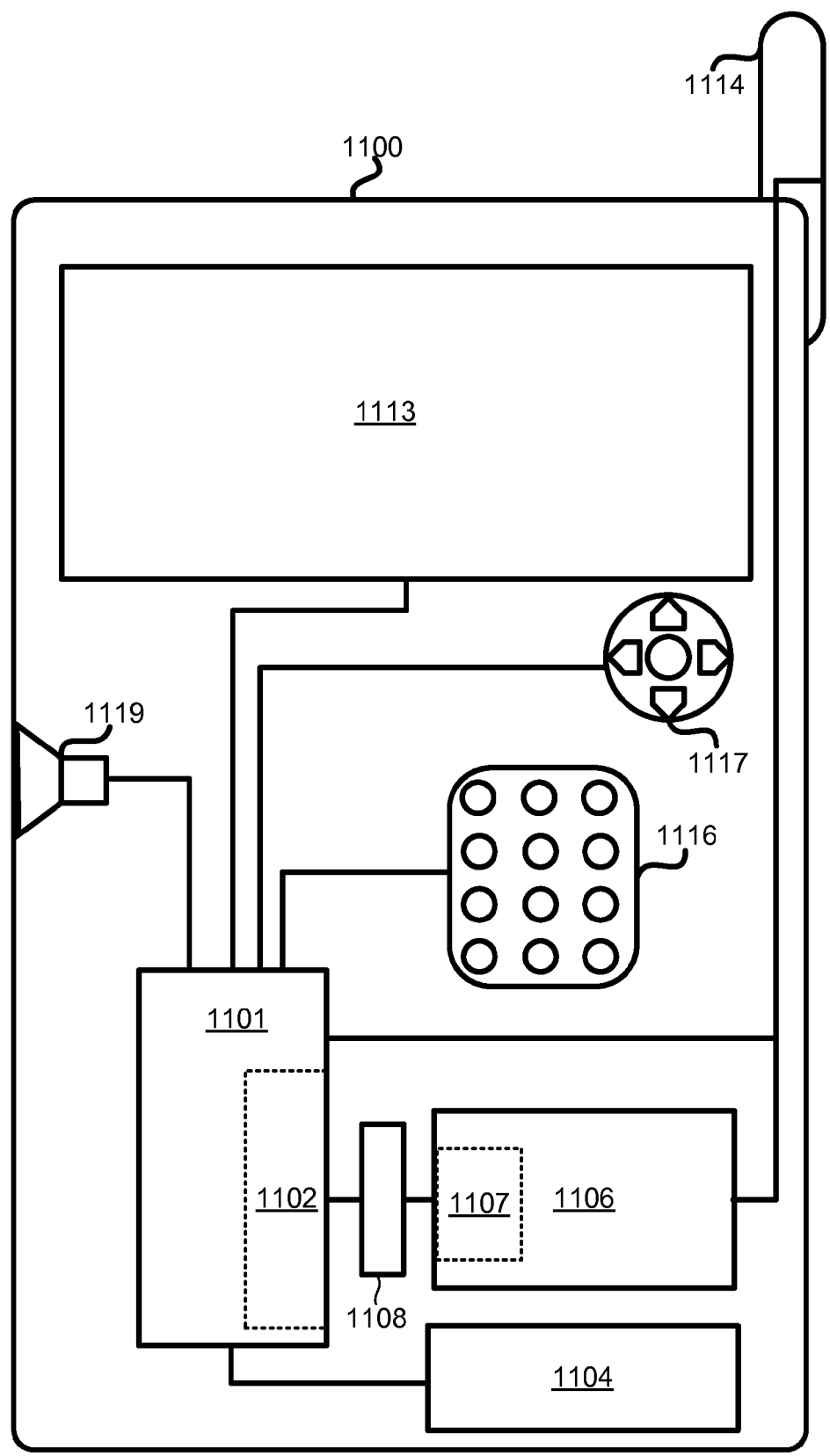
FIG. 11 is a component block diagram of a mobile device suitable for use in an embodiment.

The various embodiments may be used in devices that feature two processors which must exchange large amounts of data in real time. An example of such a device is a Media FLO mobile receiver. A Media FLO mobile receiver 1100 suitable for use with the various embodiments will have in common the components illustrated in FIG. 11. For example, a Media FLO mobile receiver 1100 may include a MSM chip 1101 that includes a first processor 1102 (e.g., an ARM processor 404) coupled to internal memory 1104. A Media FLO mobile receiver 1100 may further include a mobile broadcast receiver 1106, which includes a second processor 1107 (e.g., an RDSP 408). The first processor 1102 and the second processor 1107 may connected to a data interface 1108, such as an SDIO access bus. Additionally, the Media FLO mobile receiver 1100 may have an antenna 1114 for sending and receiving electromagnetic radiation that is connected to the MSM 1101 and to the mobile broadcast receiver 1106. The MSM 1101 may be coupled to a display 1103 for displaying video images, and to a speaker 1119 for generating sound. A Media FLO mobile receiver 1100 may also include a key pad 1116 or miniature keyboard and menu selection buttons or rocker switches 1117 for receiving user inputs.

The processors 1102, 1107 may be any programmable microprocessor, microcomputer or multiple processor chip or chips that can be configured by software instructions (applications) to perform a variety of functions, including the functions of the various embodiments described herein. In some mobile devices, multiple processors 1102, 1107 may be provided, such as one processor dedicated to wireless communication functions and one processor dedicated to running other applications. Typically, software applications may be stored in the internal memory 1104 before they are accessed and loaded into the processor 1102, 1107. In some implementations, the processors 1102, 1107 may include internal memory sufficient to store the application software instructions and data tables (e.g., the static and dynamic interface tables). For the purposes of this description, a general reference to memory refers to all memory accessible by the processors 1102, 1107, including internal memory 1104, removable memory plugged into the device or server (not shown), and memory within the processors 1102, 1107 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a non-transitory computer-readable medium. Non-transitory computer-readable media includes any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable readable medium and/or non-transitory computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for passing data from a first processor to a second processor through a data interface, comprising:
   transmitting a static table of a first set of information from the first processor to the second processor via the data interface in a first transmission;
   storing the static table in memory accessible by the second processor;
   transmitting a dynamic table of a second set of information from the first processor to the second processor via the data interface in a second transmission;
   storing the dynamic table in memory accessible by the second processor;
   accessing the second set of information in the dynamic table to determine an indicated portion of the first set of information in the static table to implement; and
   implementing, in the second processor, the indicated portion from the first set of information stored in the static table in the memory accessible by the second processor, whereby the second set of information of the dynamic table is used to control the second processor implementing the indicated portion from the first set of information of the static table.

2. The method of claim 1, wherein the first set of information in the static table comprises a plurality of data tables each including register indices and values to be stored in registers identified by the indices.

3. The method of claim 2, wherein the second set of information in the dynamic table identifies a particular one or more of the plurality of data tables to be used in configuring hardware registers.

4. The method of claim 3, wherein the second set of information in the dynamic table further identifies a sequence of data tables within the plurality of data tables to be used in configuring hardware registers.

5. The method of claim 1, further comprising sending an interrupt from the first processor to the second processor following transmission of the dynamic table.

6. The method of claim 1, further comprising transmitting a message from the first processor to the second processor informing the second processor that the static table is about to be transmitted.

7. The method of claim 1, further comprising transmitting a message from the first processor to the second processor informing the second processor that the dynamic table is about to be transmitted.

8. The method of claim 1, further comprising:
   determining whether parameters included in the dynamic table are valid or invalid; and
   transmitting an error interrupt message from the second processor to the first processor when it is determined that the parameters included in the dynamic table are invalid, wherein implementing the indicated portion of the first set of information in the second processor is performed when it is determined that the parameters included in the dynamic table are valid.

9. The method of claim 3, wherein implementing the indicated portion of the first set of information in the second processor comprises looping through each of the plurality of data tables within the static table identified in the dynamic table until all operations indicated in the identified data tables have been accomplished.

10. The method of claim 1, wherein the static table and dynamic table are transmitted from the first processor to the second processor via an SDIO (Secure Digital input/output) data interface.

11. The method of claim 1, further comprising configuring the second processor as an early operation within an initialization sequence managed by the first processor, wherein configuring the second processor is accomplished prior to transmission of the static table of a first set of information from the first processor to the second processor.

12. An electronic device, comprising:
   a first processor; and
   a second processor coupled to the first processor via a data interface circuit, wherein the first and second processors are configured with processor-executable instructions to perform operations comprising:
      transmitting a static table of a first set of information from the first processor to the second processor via the data interface in a first transmission;
      storing the static table in memory accessible by the second processor;
      transmitting a dynamic table of a second set of information from the first processor to the second processor via the data interface in a second transmission;
      storing the dynamic table in memory accessible by the second processor;
      accessing the second set of information in the dynamic table to determine an indicated portion of the first set of information in the static table to implement; and
      implementing, in the second processor, the indicated portion from the first set of information stored in the static table in the memory accessible by the second processor, whereby the second set of information of the dynamic table is used to control the second processor implementing the indicated portion from the first set of information of the static table.

13. The electronic device of claim 12, wherein the first set of information in the static table comprises a plurality of data tables each including register indices and values to be stored in registers identified by the indices.

14. The electronic device of claim 13, wherein the second set of information in the dynamic table identifies a particular one or more of the plurality of data tables to be used in configuring hardware registers.

15. The electronic device of claim 14, wherein the second set of information in the dynamic table further identifies a sequence of data tables within the plurality of data tables to be used in configuring hardware registers.

16. The electronic device of claim 12, wherein the first and second processors are configured with processor-executable instructions to perform operations further comprising sending an interrupt from the first processor to the second processor following transmission of the dynamic table.

17. The electronic device of claim 12, wherein the first and second processors are configured with processor-executable instructions to perform operations further comprising transmitting a message from the first processor to the second processor informing the second processor that the static table is about to be transmitted.

18. The electronic device of claim 12, wherein the first and second processors are configured with processor-executable instructions to perform operations further comprising transmitting a message from the first processor to the second processor informing the second processor that the dynamic table is about to be transmitted.

19. The electronic device of claim 12, wherein the first and second processors are configured with processor-executable instructions to perform operations further comprising:
determining whether parameters included in the dynamic table are valid or invalid; and
transmitting an error interrupt message from the second processor to the first processor when it is determined that the parameters included in the dynamic table are invalid, wherein implementing the indicated portion of the first set of information in the second processor is performed when it is determined that the parameters included in the dynamic table are valid.

20. The electronic device of claim 15, wherein implementing the indicated portion of the first set of information in the second processor comprises looping through each of the plurality of data tables within the static table identified in the dynamic table until all operations indicated in the identified data tables have been accomplished.

21. The electronic device of claim 12, wherein the static table and dynamic table are transmitted from the first processor to the second processor via an SDIO (Secure Digital input/output) data interface.

22. The electronic device of claim 12, wherein the first and second processors are configured with processor-executable instructions to perform operations further comprising configuring the second processor as an early operation within an initialization sequence managed by the first processor, wherein configuring the second processor is accomplished prior to transmission of the static table of a first set of information from the first processor to the second processor.

23. An electronic device, comprising:
a first processor;
a second processor coupled to the first processor via a data interface circuit;
means for transmitting a static table of a first set of information from the first processor to the second processor via the data interface in a first transmission;
means for storing the static table in memory accessible by the second processor;
means for transmitting a dynamic table of a second set of information from the first processor to the second processor via the data interface in a second transmission;
means for storing the dynamic table in memory accessible by the second processor;
means for accessing the second set of information in the dynamic table to determine an indicated portion of the first set of information in the static table to implement; and
means for implementing, in the second processor, the indicated portion from the first set of information stored in the static table in the memory accessible by the second processor, whereby the second set of information in the dynamic table is used to control the second processor implementing the indicated portion from the first set of information of the static table.

24. The electronic device of claim 23, wherein the first set of information in the static table comprises a plurality of data tables each including register indices and values to be stored in registers identified by the indices.

25. The electronic device of claim 24, wherein the second set of information in the dynamic table identifies a particular one or more of the plurality of data tables to be used in configuring hardware registers.

26. The electronic device of claim 25, wherein the second set of information in the dynamic table further identifies a sequence of data tables within the plurality of data tables to be used in configuring hardware registers.

27. The electronic device of claim 23, further comprising means for sending an interrupt from the first processor to the second processor following transmission of the dynamic table.

28. The electronic device of claim 23, further comprising means for transmitting a message from the first processor to the second processor informing the second processor that the static table is about to be transmitted.

29. The electronic device of claim 23, further comprising means for transmitting a message from the first processor to the second processor informing the second processor that the dynamic table is about to be transmitted.

30. The electronic device of claim 23, further comprising:
means for determining whether parameters included in the dynamic table are valid or invalid; and
means for transmitting an error interrupt message from the second processor to the first processor when it is determined that the parameters included in the dynamic table are invalid,
wherein means for implementing the indicated portion of the first set of information in the second processor comprises means for implementing the indicated portion of the first set of information in the second processor when it is determined that the parameters included in the dynamic table are valid.

31. The electronic device of claim 25, wherein means for implementing the indicated portion of the first set of information in the second processor comprises means for looping through each of the plurality of data tables within the static table identified in the dynamic table until all operations indicated in the identified data tables have been accomplished.

32. The electronic device of claim 23, wherein the data interface circuit is an SDIO (Secure Digital input/output) data interface, and the static table and dynamic table are transmitted from the first processor to the second processor via the SDIO data interface.

33. The electronic device of claim 23, further comprising means for configuring the second processor as an early operation within an initialization sequence managed by the first processor, wherein means for configuring the second processor comprises means for configuring the second processor prior to transmission of the static table of a first set of information from the first processor to the second processor.

34. A non-transitory processor-readable storage medium having stored thereon processor-executable instructions configured to cause a first processor and a second processor within a single electronic device to perform operations comprising:
transmitting a static table of a first set of information from the first processor to the second processor via a data interface in a first transmission;
storing the static table in memory accessible by the second processor;

transmitting a dynamic table of a second set of information from the first processor to the second processor via the data interface in a second transmission;

storing the dynamic table in memory accessible by the second processor;

accessing the second set of information in the dynamic table to determine an indicated portion of the first set of information in the static table to implement; and implementing, in the second processor, the indicated portion from the first set of information stored in the static table in the memory accessible by the second processor, whereby the second set of information of the dynamic table is used to control the second processor implementing the indicated portion from the first set of information of the static table.

35. The processor-readable non-transitory storage medium of claim 34, wherein the first set of information in the static table comprises a plurality of data tables each including register indices and values to be stored in registers identified by the indices.

36. The non-transitory processor-readable storage medium of claim 35, wherein the second set of information in the dynamic table identifies a particular one or more of the plurality of data tables to be used in configuring hardware registers.

37. The non-transitory processor-readable storage medium of claim 36, wherein the second set of information in the dynamic table further identifies a sequence of data tables within the plurality of data tables to be used in configuring hardware registers.

38. The non-transitory processor-readable storage medium of claim 34, wherein the stored processor-executable instructions are configured to cause the first processor and the second processor within a single electronic device to perform operations further comprising sending an interrupt from the first processor to the second processor following transmission of the dynamic table.

39. The non-transitory processor-readable storage medium of claim 34, wherein the stored processor-executable instructions are configured to cause the first processor and the second processor within a single electronic device to perform operations further comprising transmitting a message from the first processor to the second processor informing the second processor that the static table is about to be transmitted.

40. The non-transitory processor-readable storage medium of claim 34, wherein the stored processor-executable instructions are configured to cause the first processor and the second processor within a single electronic device to perform operations further comprising transmitting a message from the first processor to the second processor informing the second processor that the dynamic table is about to be transmitted.

41. The non-transitory processor-readable storage medium of claim 34, wherein the stored processor-executable instructions are configured to cause the first processor and the second processor within a single electronic device to perform operations further comprising:

determining whether parameters included in the dynamic table are valid or invalid; and transmitting an error interrupt message from the second processor to the first processor when it is determined that the parameters included in the dynamic table are invalid, wherein implementing the indicated portion of the first set of information in the second processor is performed when it is determined that the parameters included in the dynamic table are valid.

42. The non-transitory processor-readable storage medium of claim 36, wherein implementing the indicated portion of the first set of information in the second processor comprises looping through each of the plurality of data tables within the static table identified in the dynamic table until all operations indicated in the identified data tables have been accomplished.

43. The non-transitory processor-readable storage medium of claim 34, wherein the static table and dynamic table are transmitted from the first processor to the second processor via an SDIO (Secure Digital input/output) data interface.

44. The non-transitory processor-readable storage medium of claim 34, wherein the stored processor-executable instructions are configured to cause a first processor and a second processor within a single electronic device to perform operations further comprising configuring the second processor as an early operation within an initialization sequence managed by the first processor, wherein configuring the second processor is accomplished prior to transmission of the static table of a first set of information from the first processor to the second processor.

* * * * *